(12) United States Patent
Huang

(10) Patent No.: US 6,698,957 B2
(45) Date of Patent: Mar. 2, 2004

(54) FOLDABLE KEYBOARD WITH POINT STICK

(75) Inventor: Mao-Sung Huang, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 28 days.

(21) Appl. No.: 10/125,748

(22) Filed: Apr. 18, 2002

(65) Prior Publication Data

US 2002/0164187 A1 Nov. 7, 2002

(30) Foreign Application Priority Data

May 7, 2001 (TW) .................................. 90110804 A

(51) Int. Cl.[7] .............................. B41J 5/08; G09G 5/08; H03K 17/94
(52) U.S. Cl. ..................... 400/472; 400/495; 400/494; 400/473; 400/479; 400/480; 400/485; 400/486; 400/490; 345/157; 345/158; 345/161; 345/162; 345/167; 341/20; 341/22
(58) Field of Search ............... 400/495, 494, 400/473, 479, 480, 472, 485, 486, 490; 345/157, 158, 161, 162, 167; 341/20, 22

(56) References Cited

U.S. PATENT DOCUMENTS

| | | | | |
|---|---|---|---|---|
| 5,424,728 A | * | 6/1995 | Goldstein ..................... 341/22 |
| 5,644,338 A | * | 7/1997 | Bowen ......................... 345/168 |
| 5,788,386 A | * | 8/1998 | Hayashi et al. ............. 400/489 |
| D410,233 S | * | 5/1999 | Renk .......................... D14/100 |
| 5,995,025 A | * | 11/1999 | Sternglass et al. ............ 341/22 |
| 6,081,207 A | * | 6/2000 | Batio .......................... 341/20 |
| 6,168,331 B1 | * | 1/2001 | Vann .......................... 400/472 |
| 6,259,006 B1 | * | 7/2001 | Parienti ....................... 84/171 |
| 6,390,699 B1 | * | 5/2002 | Lam ........................... 400/472 |

* cited by examiner

Primary Examiner—Andrew H. Hirshfeld
Assistant Examiner—Marvin P. Crenshaw
(74) Attorney, Agent, or Firm—Snell & Wilmer L.L.P.

(57) ABSTRACT

The present invention relates to a foldable keyboard, and more particularly, to a foldable keyboard adapted for a point stick and/or at least one hot key. Two or more keypad portions are hingably connected by a connection board on which a point stick or at least one hot key is disposed. When the keyboard is in a deployed configuration, the keypad portions slide along the keyboard plane to combine with the point stick or the hot keys so that a complete keyboard is formed. The connection board of the present invention may further include a circuit board to be electrically connected with each key and the point stick or the hot keys in order to receive and decode the signals from each key and the point stick or the hot keys.

20 Claims, 7 Drawing Sheets

FOLDABLE KEYBOARD WITH POINT STICK

CROSS REFERENCE TO RELATED APPLICATIONS

This Application claims priority to Taiwan Patent Application No. 090110804 entitled "Foldable Keyboard with Point Stick", filed May 7, 2001.

FIELD OF INVENTION

The present invention relates to a foldable keyboard, and more particularly, to a foldable keyboard capable of including a point stick or a hot key.

BACKGROUND OF THE INVENTION

Since the advent of notebook computers, even smaller computers have been developed. Many of these smaller computers have met with only limited success, however, partially because their compact size limits space in which input/output ("I/O") devices may be disposed. Furthermore, many computer users have been disappointed with display quantity and quality in many "sub-notebook" computers. Further, the size of many conventional input devices, such as keyboards and pointing devices, are too small to allow optimum comfort, speed, and accuracy while inputting data. Many sub-notebook computers therefore require users to sacrifice both display and I/O convenience. Even though the data processing and the storage capacity of smaller computers is often equivalent to that of a desktop computer, such machines have not yet adequately replaced the user's desktop computer.

One type of smaller-than-notebook computer design that has proven useful and quite popular, however, is the personal digital assistant (PDA) that includes a generally-rectangular chassis with a front surface thereon. The front surface is typically dominated by a LCD display device. In contrast to other computer designs, a PDA does typically not include a traditional "QWERTY" or equivalent keyboard. Instead, a PDA is generally equipped with a few control buttons on the front or side surfaces and a stylus. Users write on the LCD with the stylus to enter data to the PDA. According to the user's preferences, the PDA generally stores the user's writing as a bitmapped form. This bitmapped form often requires substantial memory for storage and, therefore, limits the PDA's ability to manipulate the writing. Alternatively, with the aid of handwriting recognition software stored in the PDA, the PDA can translate the writing into representative codes or characters suitable for more efficient processing and storage.

Alternatively, users often use the stylus and/or the control buttons on the front and side surfaces to input data by moving a pointer over the LCD to point at a virtual keyboard shown on the screen. This input method, however, is much slower and clumsier than the traditional keyboard.

Due to size limitations, PDAs are generally unable to utilize traditional keyboards. Therefore, a solution of using an external keyboard was proposed. Users may separate the external keyboard from the PDA when it is not in use, so that only the PDA needs to be carried as the user travels. While inputting data, the user connects the external keyboard to the PDA so that data may be entered quickly and conveniently.

External keyboards generally provide the user with a familiar and comfortable QWERTY keyboard, and are generally designed to be foldable to reduce the size of the keyboard and to make the keyboard more portable. FIG. 1A is a foldable keyboard as described in the U.S. Pat. No. 6,174,097, incorporated herein by reference. The foldable keyboard shown in FIG. 1A consists of four keypad portions, and each keypad portion is connected with adjacent keypad portions through a pivot. A subset of keys on each portion typically slides on each of the keypad portions, to a proper position in a folded configuration. FIG. 1B is a perspective diagram of a keyboard in a folded configuration according to the prior art. As shown therein, the foldable keyboard is W-shaped and concertina-like when the keyboard is folded. And FIG. 1C is a perspective diagram of the foldable keyboard in a completely folded configuration according to the prior art. As shown therein, the keyboard forms a portable box-shaped case when folded. Generally, locking devices are used for preventing undesired movement of the keypad portions and the subset of keys while the keyboard is folded.

The foldable keyboard shown, however, lacks additional features such as a point stick or a hot key. Moreover, the space and thickness of the keyboard is suitably sacrificed to reduce the size of the keyboard. As a result, internal space for circuit boards or other components is limited. Designing and arranging the circuitry in the keyboard and the keys therefore become more difficult and complicated.

SUMMARY OF THE INVENTION

One aspect of exemplary embodiments of the present invention is to provide a foldable keyboard, and more particularly, a foldable keyboard with a point stick and/or at least one hot key. The foldable keyboard of an exemplary embodiment includes a first keypad portion and a second keypad portion, with a connection pad disposed between the two keypad portions. The keypad portions may be rotatably connected to the connection pad. A further embodiment provides a point stick disposed on the connection pad so that a user can operate a cursor on an external monitor or an external electronic device directly from the keyboard without using a mouse. When the foldable keyboard is in a deployed configuration, the subsets of keys on the first keypad portion and the second keypad portion can be slid towards the point stick to improve compactability. Furthermore, at least one hot key may be disposed on the connection pad for the user to operate the external monitor or external electronic device.

Another aspect of exemplary embodiments is to reduce the size of the circuit board and to reduce difficulties in manufacturing and assembly. When the foldable keyboard connects with a supporting mechanism of an electronic device including a circuit board, it may further include a flexible circuit board electrically connecting with the circuit board of the supporting mechanism for receiving and decoding signals from the keys, the point stick or the hot keys.

DETAILED DESCRIPTION

Figure 1A:
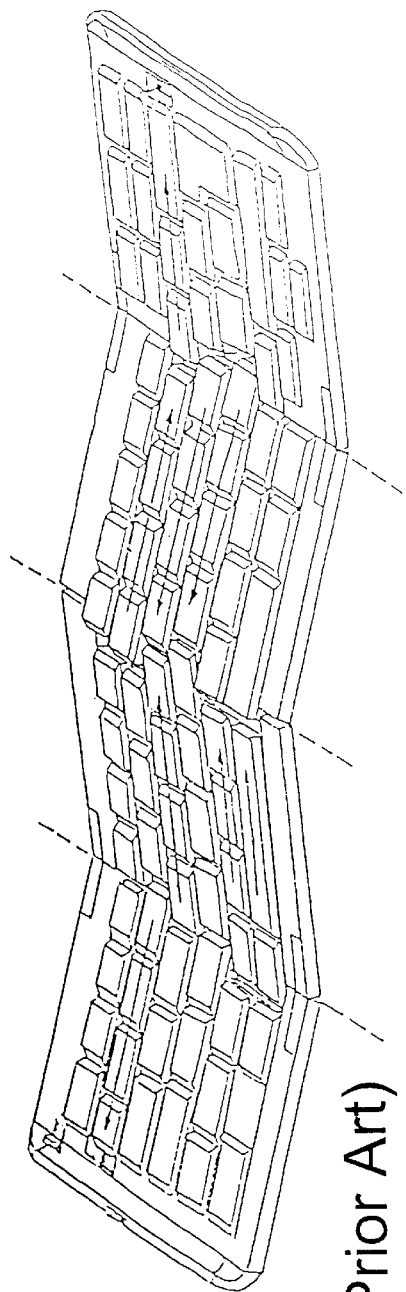
FIG. 1A is a schematic diagram of a foldable keyboard in a deployed configuration according to the prior art.
Figure 1C:
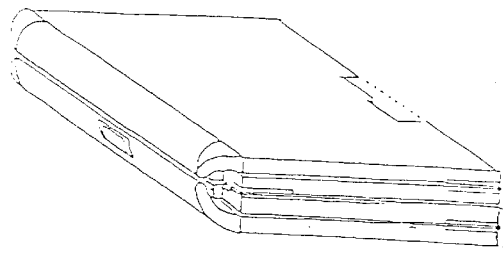
FIG. 1C is a schematic diagram of the foldable keyboard in a folded storage configuration according to an exemplary embodiment.
Figure 1B:
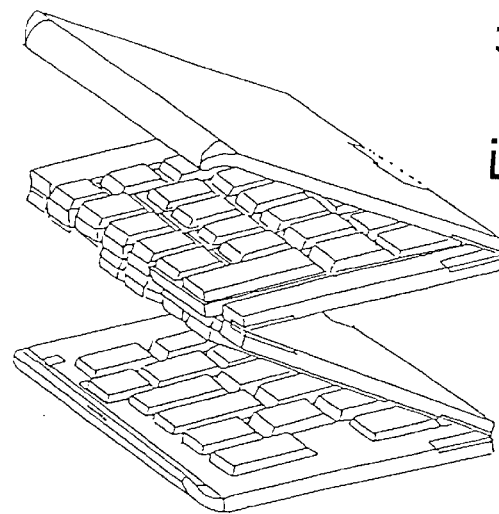
FIG. 1B is a schematic diagram of the foldable keyboard in a collapsed configuration according to the prior art.
Figure 2:
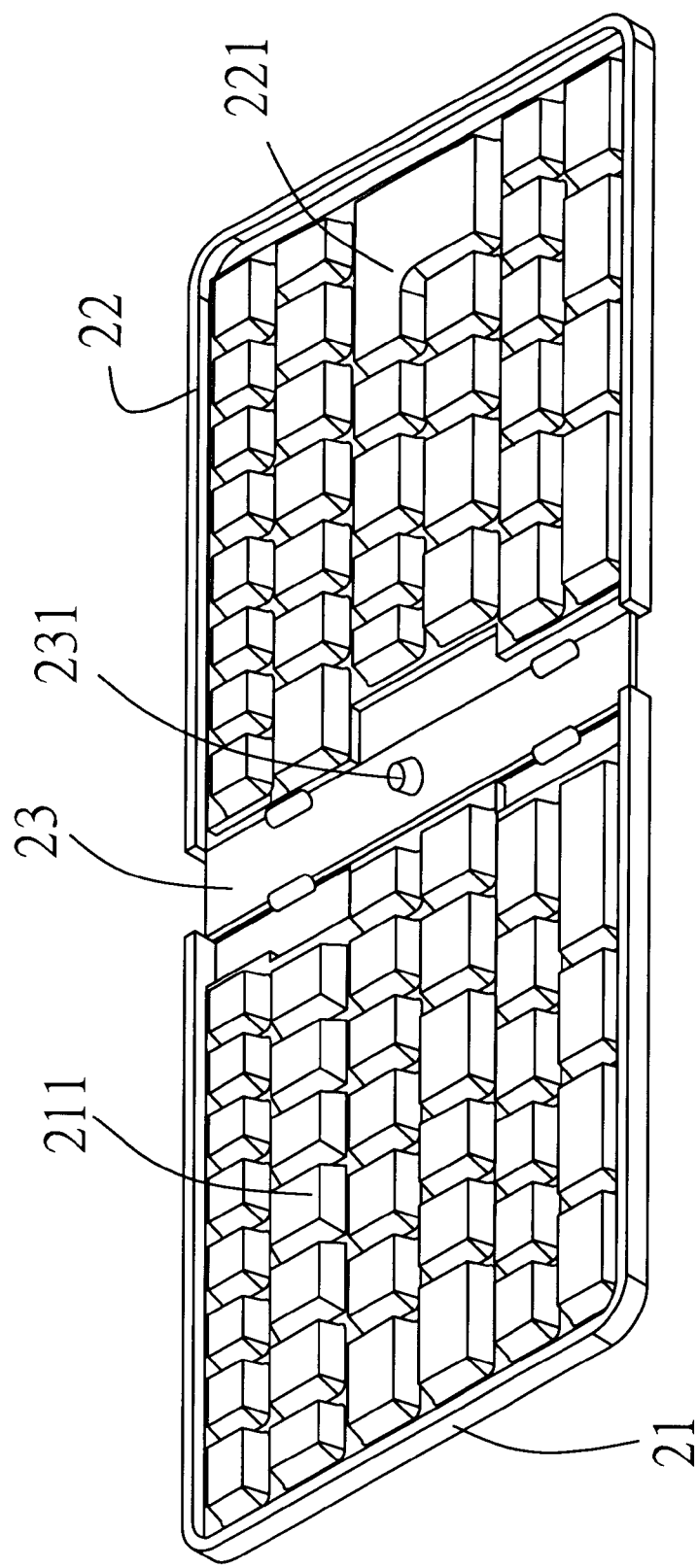
FIG. 2 is a schematic diagram of a foldable keyboard in a deployed configuration according to an exemplary embodiment.

FIG. 2 is a schematic diagram of an exemplary foldable keyboard in a deployed configuration according to an exemplary embodiment of the present invention. The foldable keyboard suitably includes a first keypad portion 21 and a second keypad portion 22, wherein a first subset of keys 211 is disposed on the first keypad portion 21, and a second subset of keys 221 is disposed on the second keypad portion 22. An optional connection pad 23 is disposed between the first keypad portion 21 and the second keypad portion 22. An optional point stick 231 is disposed on the connection pad 23 for controlling a cursor or a scroll bar on a monitor or an electronic device (not shown). Both the first keypad portion 21 and the second keypad portion 22 are respectively rotatable along and connected to the connection pad 23 via connecting devices or elements. In the embodiment shown, a hinge is used as the connecting device, but the invention is not limited thereto.

As shown in FIG. 2, when the foldable keyboard of the present invention is in a deployed configuration, there is a distance between the first subset of keys 211 on the first keypad portion 21 and the point stick 231. Similarly, there is a distance between the second subset of keys 221 on the second keypad portion 22 and the point stick 231. Both of these distances are provided to allow folding of the keyboard. Furthermore, the first subset of keys 211 is slidably connected with the first keypad portion 21. Similarly, the second subset of keys 221 is slidably connected with the second keypad portion 22 such that the keys are moveable with respect to the keypad base.

Figure 3:
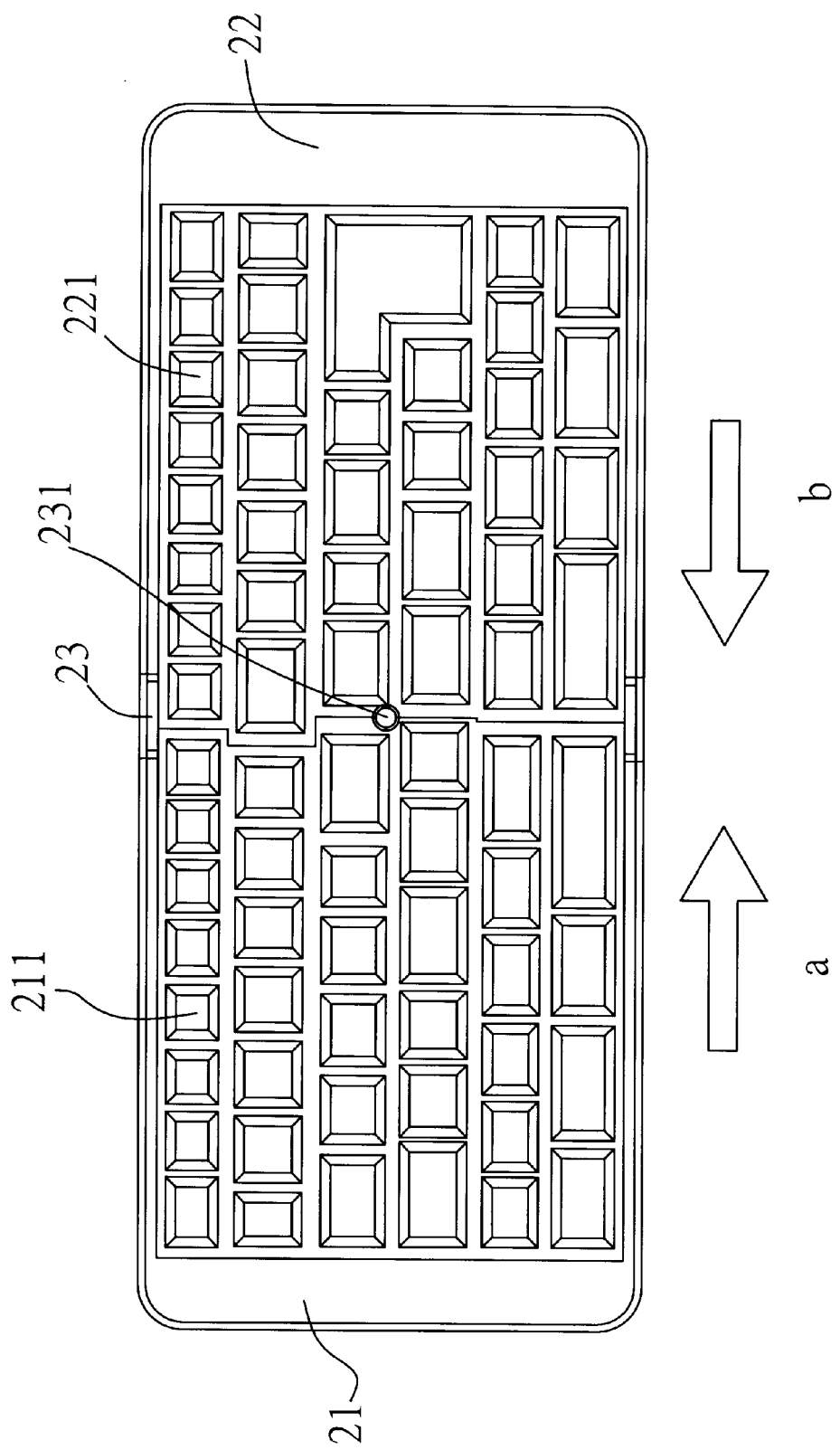
FIG. 3 is a schematic diagram of a combination of keys and a point stick according to an exemplary embodiment.

As shown in FIG. 3, when the foldable keyboard is in the deployed (i.e. "open" or "in-use" state) configuration, the first subset of keys 211 on the first keypad portion 21 slides along the direction shown as the arrowhead "a" in FIG. 3, and moved towards point stick 231. In the same way, the second subset of keys 221 on the second keypad portion 22 slides along the direction shown as the arrowhead "b" in FIG. 3, and moved towards point stick 231. FIG. 3 shows the combination of the first subset of keys 211, the second subset of keys 221, and point stick 231. In the in-use state, the first subset of keys 211 are adjacent to the second subset of keys 221, while point stick 231 is surrounded by both of them so as to form a traditional QWERTY keyboard.

Figure 4:
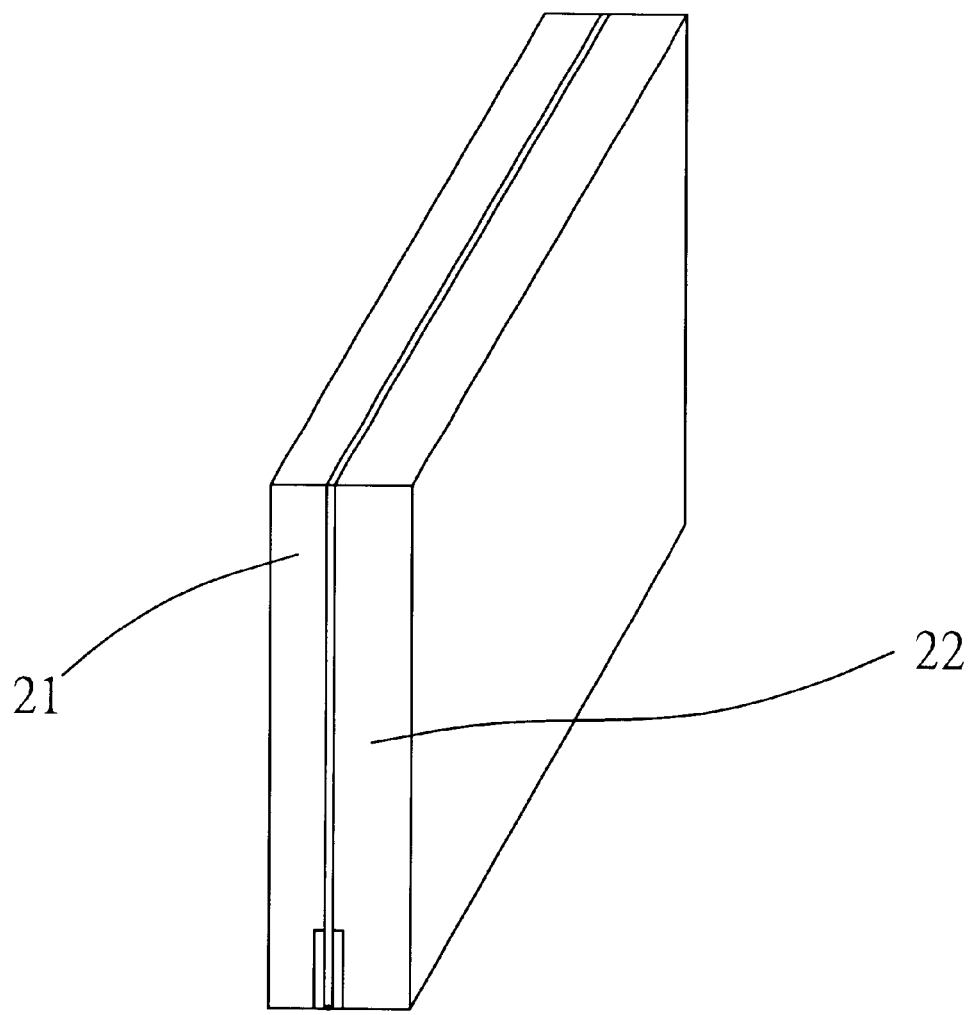
FIG. 4 is a schematic diagram of the foldable keyboard in a folded storage configuration according to an exemplary embodiment.

FIG. 4 is a schematic diagram of the foldable keyboard in the configuration of a folded state according to an exemplary embodiment. When the foldable keyboard is in the folded configuration, the first subset of keys 211 and the second subset of keys 221 slide apart from each other along the opposite sides of the first keypad portion 21 and the second keypad portion 22. Two distances are thusly introduced between the first subset of keys 211 and the point stick 231, and between the second subset of keys 221 and the point stick 231, respectively. The first keypad portion 21 and the second keypad portion 22 then rotate along the respective hinges on the opposite sides of the connection pad 23, and overlap with each other to collapse the foldable keyboard into a folded state that is compact and portable for the user.

Figure 5:
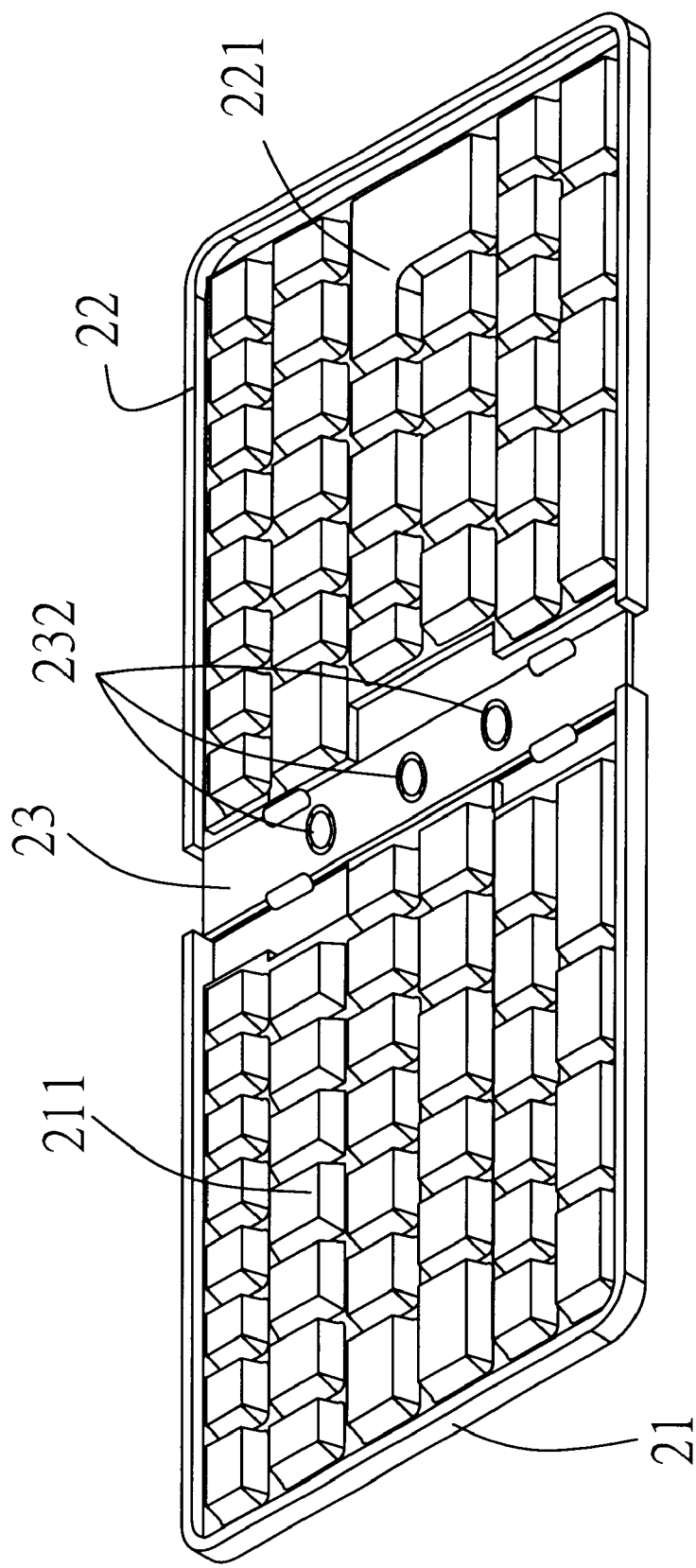
FIG. 5 is a schematic diagram of an alternative foldable keyboard in a deployed configuration according to an exemplary embodiment.

In the exemplary embodiment described above, point stick 231 is disposed on the connection pad 23. In an alternative embodiment of the present invention, one or more hot keys 232 are disposed on connection pad 23. FIG. 5 is a schematic diagram of an exemplary foldable keyboard in a deployed configuration with three hot keys 232. The hot keys 232 are disposed on the connection pad 23. Users operate and switch rapidly between different functions using the hot keys 232, as appropriate. Alternatively, hot keys 232 could be used for application-specific functions, or for any other purpose. For example, one of the hot keys could be configured to facilitate rapid connection with the Internet.

Figure 6A:
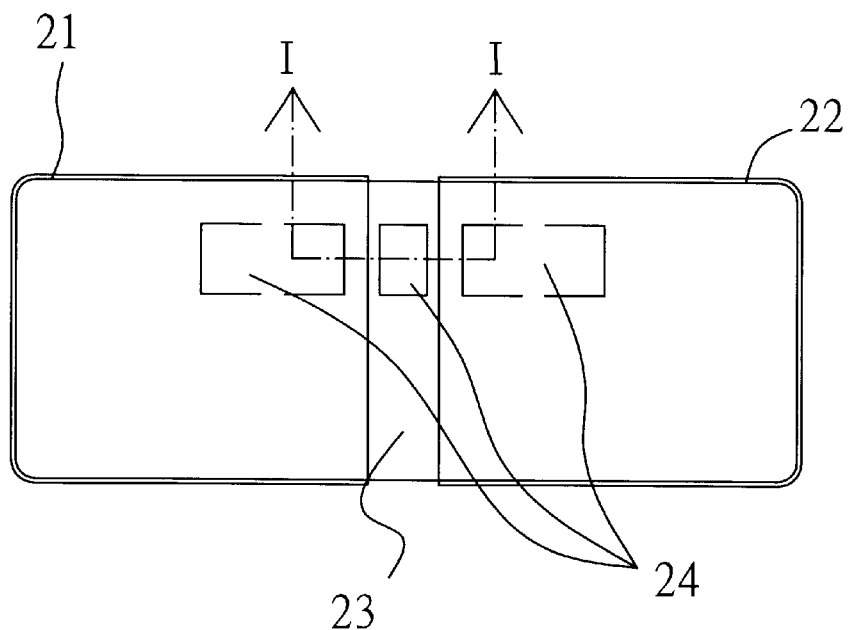
FIG. 6A is a schematic diagram of a circuit board of the foldable keyboard according to an exemplary embodiment.
Figure 6B:
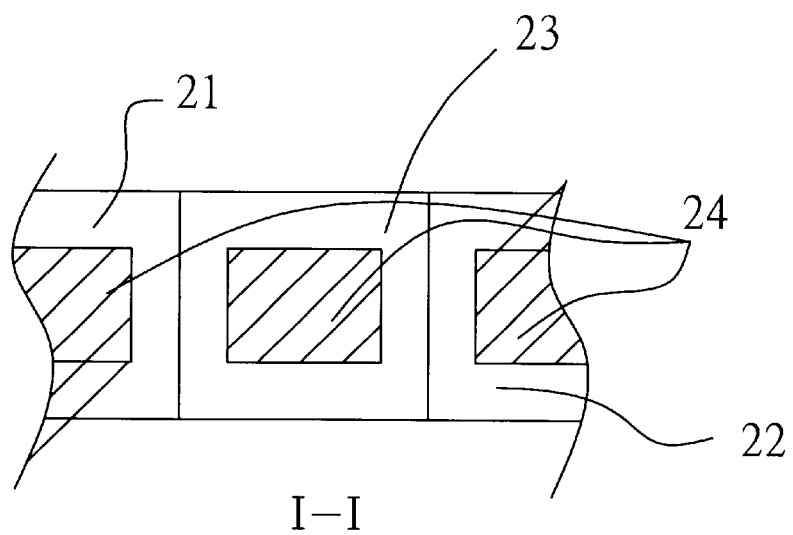
FIG. 6B is a cross-sectional view of the circuit board of the foldable keyboard according to an exemplary embodiment.

FIG. 6a is a schematic diagram of an exemplary circuit board 24 suitable for use with a foldable keyboard. The keyboard thus further includes a circuit board 24 disposed within connection pad 23. The circuit board 24 is appropriately scaled-down and disposed in the connection pad 23 such that the manufacture and assembly for the circuit board is simplified. The circuit board 24 may be electrically connected with the first subset of keys 211, the second subset of keys 221, point stick 231 and/or the hot keys 232 for receiving and decoding signals. Circuit board 24 is not limited to disposition within the connection pad 23. As shown in FIG. 6A, in another embodiment, the circuit board 24 is suitably disposed within the first keypad portion 21 or the second keypad portion 22. FIG. 6B is a cross-sectional view of the circuit board 24 of the foldable keyboard according to an exemplary embodiment. Circuit board 24 is disposed within the connection pad 23, or it can be disposed in the first keypad portion 21, or in the second keypad portion 22 for space-saving of the foldable keyboard.

Figure 7:
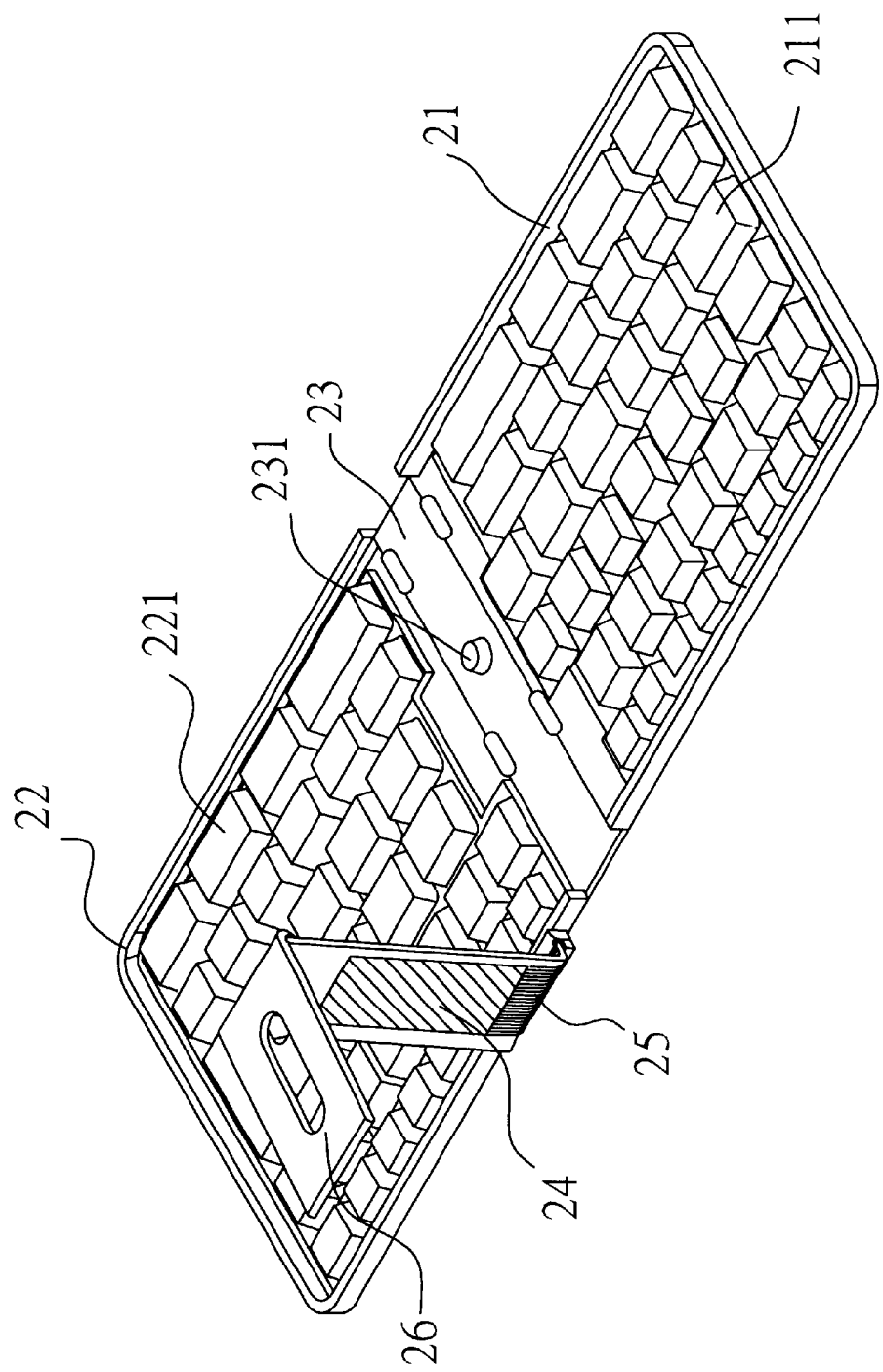
FIG. 7 is a schematic diagram of a combination of the foldable keyboard and an electronic device holder according to an exemplary embodiment.

FIG. 7 shows a schematic diagram of an exemplary combination of a foldable keyboard and the supporting mechanism 26 of an electronic device. The foldable keyboard further includes a flexible circuit board 25 when a circuit board 24 formed on the supporting mechanism instead of the circuit board 24 disposed within the foldable keyboard. The flexible circuit board 25 may be electrically coupled to circuit board 24 to form a supporting mechanism 26 for receiving and decoding signals from first subset of keys 211, the second subset of keys 221, point stick 231, and/or hot keys 232.

In the exemplary embodiment shown, the foldable keyboard includes the first keypad portion 21 and the second keypad portion 22. The foldable keyboard is not limited two keypad portions, however, and any foldable keyboard including a connection pad may be within the scope of the present invention. The foldable keyboard of the present invention may be further connected to the supporting mechanism of an electronic device, wherein the electronic device is a personal digital assistant (PDA), a mobile phone, a smart phone, a minicomputer, or other electronic devices.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A foldable keyboard comprising:

a first keypad portion having a first subset of keys;

a second keypad portion having a second subset of keys;

a connection pad having a first side and a second side, the first side and the second side being respectively connected to the first keypad portion and the second keypad portion; and a point stick disposed on the connection pad;

wherein the keyboard selectively enters an in-use state and a folded state as the first keypad portion and the second keypad portion are rotated with respect to the connection pad, and, as the keyboard is in the in-use state, the first and second keypad portions and the connection pad are substantially coplanar with each other, and a portion of the first and second subsets of keys substantially cover the connection pad with the point stick exposed therebetween, and as the keyboard is in the folded state, the first keypad portion overlaps with the second keypad portion.

2. The foldable keyboard of claim 1, wherein the first subset of keys is slidably disposed on the first keypad portion.

3. The foldable keyboard of claim 1, wherein the second subset of keys is slidably disposed on the second keypad portion.

4. The foldable keyboard of claim 1, further comprising at least a hot key disposed on the connection pad.

5. The foldable keyboard of claim 1, wherein the first keypad portion is connected with the connection pad through a hinge.

6. The foldable keyboard of claim 1, wherein the second keypad portion is connected with the connection pad through a hinge.

7. The foldable keyboard of claim 1, wherein the foldable keyboard further comprises a circuit board disposed within the connection pad, and wherein the first subset of keys and the second subset of keys are electrically connected with the circuit board.

8. The foldable keyboard of claim 1, wherein the foldable keyboard further comprises a circuit board disposed within the first keypad portion, and wherein the first subset of keys and the second subset of keys are electrically connected with the circuit board.

9. The foldable keyboard of claim 1, wherein the foldable keyboard further comprises a circuit board disposed within the second keypad portion, and wherein the first subset of keys and the second subset of keys are electrically connected with the circuit board.

10. The foldable keyboard of claim 1, wherein the foldable keyboard is connected with a supporting mechanism of an electronic device, and wherein the supporting mechanism comprises a circuit board electrically connected with a circuit of the foldable keyboard through a flexible circuit board for receiving and decoding signals from the foldable keyboard.

11. A foldable keyboard comprising:

a first keypad portion having a first subset of keys;

a second keypad portion having a second subset of keys;

a connection pad having a first side, a second side, a third side, and a fourth side, the first side and the second side being respectively connected to the first keypad portion and the second keypad portion; and an input element disposed on the connection pad;

wherein the keyboard selectively enters an in-use state and a folded state as the first keypad portion and the second keypad portion are rotated with respect to the connection pad, and, as the keyboard is in the in-use state, the first and second keypad portions and the connection pad are substantially coplanar with each other, and a portion of the first and second subsets of keys substantially cover the connection pad with the input element exposed therebetween, such that the third side of the connection pad together with one side of the first and second keypad portions forms a first plane and the fourth side of the connection pad together with the opposite side of the first and second keypad portions forms a second plane, and, as the keyboard is in the folded state, the first keypad portion overlaps with the second keypad portion.

12. The foldable keyboard of claim 11, wherein the first subset of keys is slidably disposed on the first keypad portion.

13. The foldable keyboard of claim 11, wherein the second subset of keys is slidably disposed on the second keypad portion.

14. The foldable keyboard of claim 11, wherein the foldable keyboard further comprises at least a point stick disposed on the connection pad.

15. The foldable keyboard of claim 11, wherein the first keypad portion is connected with the connection pad through a hinge.

16. The foldable keyboard of claim 11, wherein the second keypad portion is connected with the connection pad through a hinge.

17. The foldable keyboard of claim 11, wherein the foldable keyboard further comprises a circuit board disposed within the connection pad, and wherein the first subset of keys and the second subset of keys are electrically connected with the circuit board.

18. The foldable keyboard of claim 11, wherein the foldable keyboard further comprises a circuit board disposed within the first keypad portion, and wherein the first subset of keys and the second subset of keys are electrically connected with the circuit board.

19. The foldable keyboard of claim 11, wherein the foldable keyboard further comprises a circuit board disposed within the second keypad portion, and wherein the first subset of keys and the second subset of keys are electrically connected with the circuit board.

20. The foldable keyboard of claim 11, wherein the foldable keyboard is connected with a supporting mechanism of an electronic device, and wherein the supporting mechanism comprises a circuit board electrically connected with a circuit of the foldable keyboard via a flexible circuit board for receiving and decoding signals from the foldable keyboard.

* * * * *